United States Patent [19]
Adris et al.

[11] Patent Number: 5,326,550
[45] Date of Patent: Jul. 5, 1994

[54] FLUIDIZED BED REACTION SYSTEM FOR STEAM/HYDROCARBON GAS REFORMING TO PRODUCE HYDROGEN

[75] Inventors: Alaa-Eldin M. Adris; John R. Grace; Choon J. Lim, all of Vancouver, Canada; Said S. Elnashaie, Riyadh, Saudi Arabia

[73] Assignee: The University of British Columbia, Vancouver, Canada

[21] Appl. No.: 965,011

[22] Filed: Oct. 23, 1992

[51] Int. Cl.$^5$ ............................................. C01B 3/26
[52] U.S. Cl. ........................................ 423/652; 48/94; 48/127.9; 48/198.6; 48/DIG. 5; 422/139; 422/147
[58] Field of Search ................. 423/652; 422/139, 147; 48/94, 198.6, DIG. 5, 127.9

[56] References Cited

U.S. PATENT DOCUMENTS

| | | | |
|---|---|---|---|
| 2,516,974 | 8/1950 | Garrison | 48/DIG. 5 |
| 3,524,819 | 8/1970 | Guerrier | 48/198.6 |
| 4,474,230 | 10/1984 | McCallister | |
| 4,713,234 | 12/1987 | Weirich et al. | 423/652 |
| 4,810,485 | 3/1989 | Marianowski et al. | |
| 4,877,550 | 10/1989 | Goetsch et al. | |
| 4,888,131 | 12/1989 | Goetsch et al. | 252/373 |
| 4,938,946 | 7/1990 | Gibson et al. | |
| 4,964,886 | 10/1990 | Bragerolle et al. | |
| 4,981,676 | 1/1991 | Minet et al. | |
| 5,073,356 | 12/1991 | Guro et al. | 423/652 |

*Primary Examiner*—Wayne Langel
*Attorney, Agent, or Firm*—C. A. Rowley

[57] ABSTRACT

Hydrogen gas is generated in a fluidized bed reactor by reacting gases namely steam and a hydrocarbon gas such as methane or natural gas in a fluidized bed of particulate catalytic material. The catalytic material is fluidized by injecting the mixture of the reacting gases at the bottom of the bed. Hydrogen generated within the bed is removed via a selectively permeable membrane that extends through the bed and through a freeboard area above the bed. The reaction is endothermic and therefore heat to maintain the bed at the desired temperature is added as required. Preferably a separator separates particulate catalytic material entrained in the gases in the freeboard area and delivers the particulate material separated from the gas back into the bed.

10 Claims, 2 Drawing Sheets

FLUIDIZED BED REACTION SYSTEM FOR STEAM/HYDROCARBON GAS REFORMING TO PRODUCE HYDROGEN

FIELD OF THE INVENTION

The present invention relates to an improved hydrogen forming reaction system using a fluidized bed reactor.

DESCRIPTION OF THE PRIOR ART

The production of hydrogen using reaction systems employing steam and hydrocarbon gases such as methane or natural gas or the like are well known in the art. These reactions are generally catalytic and are limited by intra particle diffusion and thermodynamic equilibrium.

Reactors employed for this purpose are normally fixed bed type reactors as opposed to fluidized bed reactors although fluidized bed reactors have been proposed for use in production of hydrogen in U.S. Pat. No. 3,524,819 issued Aug. 18, 1970 to Guerrieri and U.S. Pat. Nos. 4,877,550 and 4,888,131 issued Oct. 31, 1989 and Dec. 18, 1989 respectively to Goetsch and. (See also U.S. Pat. No. 4,938,946 issued Jul. 3, 1990 to Gibsoa, et al. which teaches fluidizing Regolith in particulate form for producing hydrogen gas at elevated temperature.)

The addition of heat to reformers has also been taught, for example, in U.S. Pat. No. 3,524,819 to Guerrieri and/or Deutches Patent 3,331,202 issued 1984 to Reichel. U.S. Pat. No. 4,474,230 issued Oct. 2, 1984 to McCallister teaches the use of heat pipes to introduce heat into fluidized bed reactors.

The Goetsch U.S. Pat. No. 4,877,550 also teaches rapid cooling to overcome the negative effect of the catalyst fines entrainment which reduces the reaction conversion in the freeboard zone and subsequent process lines.

Generally in such steam/hydrocarbon reaction systems, it is required that the hydrogen be separated using relatively complicated processes for increasing the purity of the hydrogen to that required for subsequent uses. It has also been proposed by Minet et al in U.S. Pat. No. 4,981,676 issued Jan. 1, 1991 to use a diffusion process for steam reforming of hydrocarbons in the production of hydrogen, carbon monoxide and carbon dioxide by employing a generally tubular, porous, ceramic membrane and providing a heated reaction zone in a container into which the membrane is received. The membrane carries the catalyst and the hydrocarbon gas and steam contact one side of the membrane to produce the hydrogen, carbon monoxide and carbon dioxide gases. The hydrogen formed selectively diffuses through the membrane and is carried off in an entraining gas.

U.S. Pat. No. 4,810,485 issued Mar. 7, 1989 to Marianowski teaches the formation of hydrogen gas in a reaction zone containing a hydrogen ion porous metallic foil which conducts hydrogen ions therethrough to remove the hydrogen ions from the packed bed as they are formed and thereby permit a reduction in the operating temperature of the bed and producing a relatively pure hydrogen that is conducted away through the tubular metallic foils to a manifold.

BRIEF DESCRIPTION OF THE PRESENT INVENTION

It is an object of the present invention to provide an improved reaction system employing a fluidized bed to react steam and hydrocarbon gas to produce hydrogen and to separate the hydrogen upon formation thereby to improve the reaction yield.

Broadly the present invention relates to a method and apparatus for producing hydrogen gas comprising forming a fluidized bed of a suitable particulate catalyst by introducing reacting gases comprising a mixture of steam and hydrocarbon gas into the bottom of said fluidized bed to fluidize said particles and form said fluidized bed, said fluidized bed occupying a portion of a vessel and forming a reaction zone, a freeboard zone in said vessel above said fluidized bed, reacting said reacting gases within said bed to produce hydrogen gas, separating said hydrogen gas as it is formed in said bed as molecular or atomic hydrogen through a perm selective membrane means that extends through said bed in the direction of flow of said reaction gases and permits transfer of hydrogen therethrough while preventing the transmission of other gases present in said reaction zone therethrough, said hydrogen gas after permeation through the membrane providing a source of relatively pure hydrogen gas.

Preferably said membrane means will also extend through said freeboard zone and separate hydrogen from said other gases in said freeboard zone.

In some embodiments said perm selective membrane means will comprise a plurality of tubes of perm selective membrane material arranged about said bed with the longitudinal axes of said tubes substantially parallel and extending in said direction of flow of said reaction gases.

Preferably adjacent said perm selective tubes will be spaced at least sufficient to permit fluidizing of said catalyst particles therebetween yet sufficiently small to provide the desired surface area exposed to said reaction zone to permit the transfer of hydrogen generated in said reaction zone.

Preferably said perm selective membrane means will comprise a plurality of modules, each said modules being formed by a plurality of perm selective membrane tubes enclosed in a protective sheath of material that permits hydrogen and other gases to pass therethrough and into contact with said perm selective membrane tubes while prohibiting the passage of said particulate catalyst.

Preferably a pressure significantly lower than that in the reaction zone will be maintained in said perm selective membrane means to improve the permeation rate of hydrogen through said perm selective membrane means.

Preferably, a heating means will be provided to supply heat needed in the reaction zone to maintain said fluidized bed at the desired reaction temperature.

Preferably, said other gases leaving said freeboard will be separated from particulate material and said particulate material will be redirected back into said fluidized bed.

Preferably, said separation will comprise centrifugally separating said particulate from said gases in centrifugal cleaner having a conical section having a particulate outlet at the small diameter end, said particulate outlet being submerged in said bed and a gas outlet from said base section at the major diameter end of said conical section for removal of cleaned gas from the system and a tangential gas inlet to said centrifugal cleaner adjacent to said gas outlet.

In some cases it may be desirable to recycle selected amount of other gas evolving from said freeboard and introduce said other gas from said freeboard into said reaction zone with said reacting gases to control fluidization of said fluidized bed.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
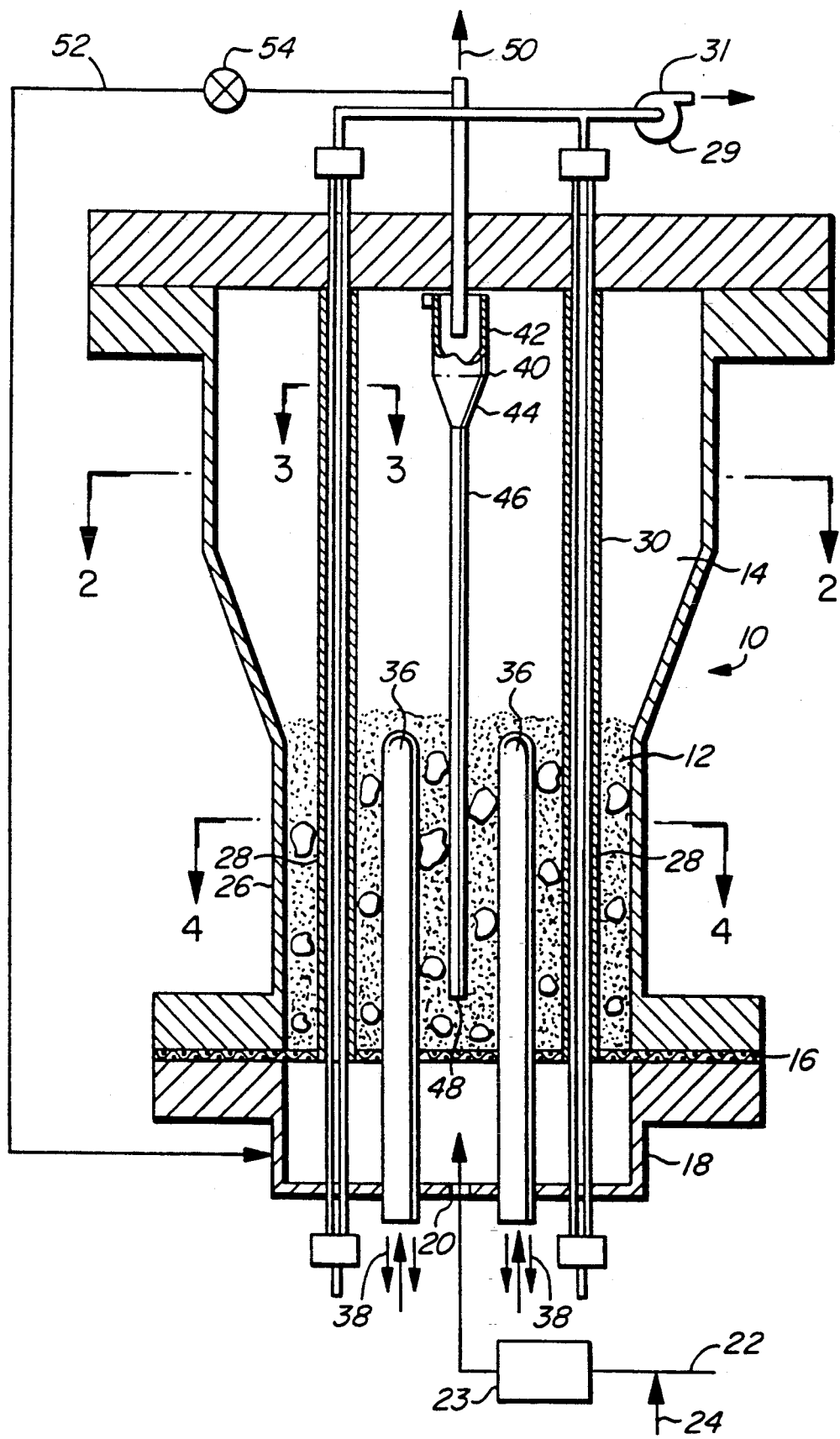
FIG. 1 is a schematic illustration of a fluidized bed reactor system constructed in accordance with the present invention.

The reactor vessel 10 schematically illustrated in FIG. 1 has two main sections; A fluidized bed section 12 forming a reaction zone 12 and a freeboard section or zone 14. A distributor plate 16 forms the bottom of the fluidized bed section 12 and connects the bottom of the fluidized bed 12 with the wind or blow box 18 which in turn is connected via gas inlet 20 to the sources of reacting gases such as methane and steam as indicated by the lines 22 and 24 respectively. Preferably a preheater 23 will preheat the reacting gases before they enter the wind box 18.

The fluidized bed section 12 is filled to the desired level with particles 26 of catalyst used for the reaction to be performed and these particles are fluidized by introducing the reacting gases entering inlet 20 into the wind box 18 and then passing up through the perforated distributor plate 16 to fluidize the particles 26 and form the fluidized bed 12.

A plurality of separation tubes 28 extend through the fluidized bed 12 and freeboard 14 with their longitudinal axes substantially parallel to the direction of flow of the gases through the bed 12 so as not to interfere significantly with the formation of the fluidized bed 12 and to minimize abrasion. These separation tubes 28 separate hydrogen formed in the bed (and the freeboard 14) from the other gases in the bed and are formed of material that permits the transmission of hydrogen in molecular or atomic form into the tubes while inhibiting the transmission of the other gases that are also present in the fluidized bed and in the freeboard 14 so that the gas within the separation tubes 28 is relatively pure hydrogen.

The output from the separation tubes 28 may be connected by a pump 29 to an outlet line 31. The pump 29 may be in the form of a vacuum pump to apply a negative pressure to the inside of the tubes 28 and improve the transmission of hydrogen through the membranes.

The separation tubes 28 extend vertically inside the bed 12 (i.e. parallel to the flow direction of the reaction gases) and the freeboard 14 i.e. from the wind box 18 to the top of the freeboard 14.

Figure 2:
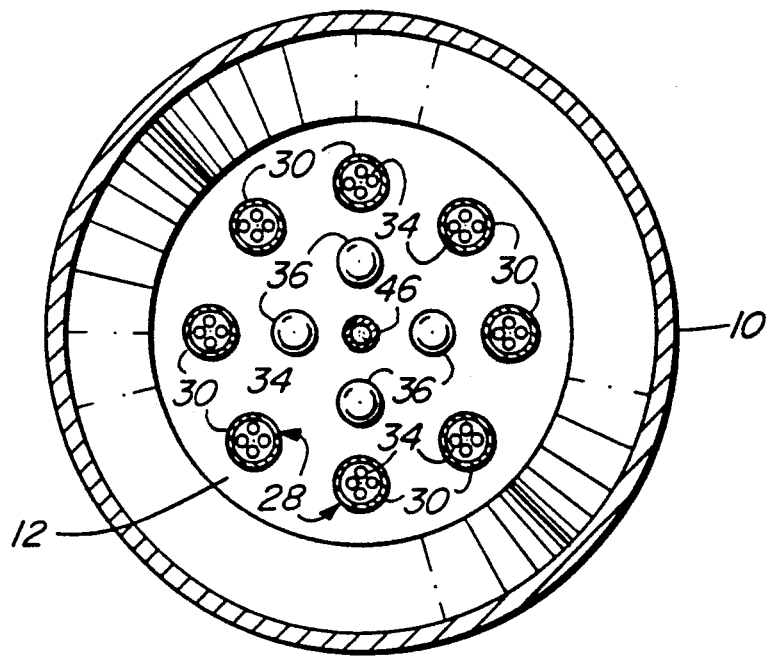
FIG. 2 is a section along the line 2—2 of FIG. 1.
Figure 3:
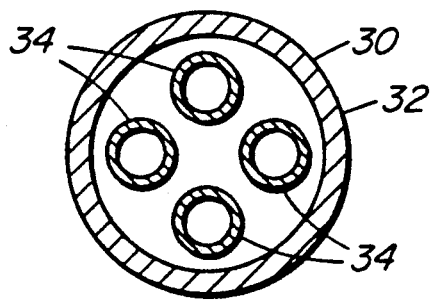
FIG. 3 is an enlarged cross section of a perm selective membrane module.

In the embodiment illustrated in FIGS. 1 to 3 inclusive each of the separation tubes 28 is in the form of a membrane module 30 which is composed of an outer protective sheath or tube 32 and inner perm selective membrane tubes 34 which in the illustrated arrangement are shown in a spaced symmetrical arrangement. The periphery of these tubes 34 need not be separated, but must provide the area required to transmit or transfer the desired amount of hydrogen therethrough. The required spacing for the modules 30 in the bed 12 will be described herein below.

The outer sheath 32 will normally be formed of an abrasion resistant material having a pore size to transmit hydrogen as well as at least most of the other gases present in the bed 12 and/or freeboard 14 but sufficiently small to prevent the passage of particulate material from the bed. This sheath or shielding tube 32 may be made for example of porous ceramic material or porous metallic material.

The perm selective membrane tubes 34 may be made of any suitable material that will, as above described, result in the partially or perfectly selective transmission of the particular material, in this case hydrogen, while tending to prevent the transmission of any of the other gases or chemicals present in the case of the present invention the reaction mixture gases present within the reactor 10. Membranes may be substantially perfectly selective to hydrogen (e.g. tubes of dense phase membranes, Ni, Nb, Pd, metal coatings on porous structures enveloped by shielding have been found satisfactory, etc.), i.e. systems wherein the mechanism of transfer is adsorption, molecule disassociation, atomic diffusion, atoms combination and then molecular desorption; or the membranes that may be partially selective to hydrogen, for example alumina base or silica base porous membranes which operate on the principal of Knudson diffusion or molecular sieving wherein selectivity depends on the pore size and relative molecular sizes of the different gases involved in the gas mixture e.g to transfer the smaller molecular size gas while preventing the transmission of the larger molecules.

The choice of which membrane to use in any particular application will depend on the application including the downstream process requirements and the conditions within the reactor.

Figure 4:
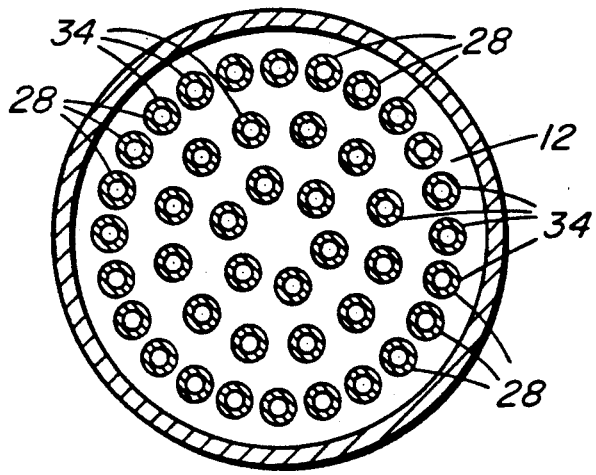
FIG. 4 is a section on the line 4—4 of FIG. 1 with parts omitted showing a modified arrangement of the perm selective membrane tubes within the fluidized bed reaction zone.

If desired the separation tubes may be directly exposed within the bed 12 as shown in FIG. 4. This arrangement may permit a higher packing of the perm selective membrane tubes within the bed 12 and freeboard 14, but obviously subjects the perm selective membrane tubes 34 directly to the fluidized action of the catalyst bed 12 which will likely significantly shorten their life span and thereby increase the operating cost of the system.

Figure 5:
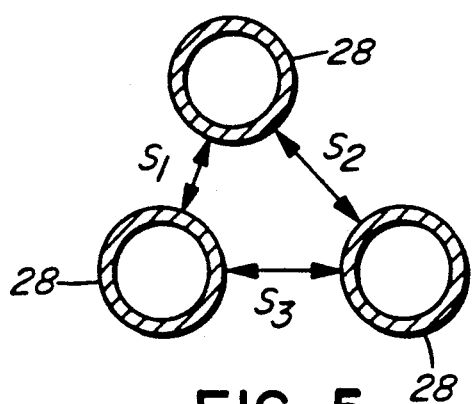
FIG. 5 is an enlarged cross section showing the spacing between adjacent perm selective membrane tubes.

The spacing of the separation tubes 28 (which may be discreet tubes 34 or modules 30) will preferably be related to the particle size of the particles 26 of catalyst to ensure there is ample space for the free movement of the particles 26 to form the fluidized bed 12. Thus the smallest distance eg $S_1$, $S_2$ or $S_3$ illustrated in FIG. 5 will be sufficient to prevent blockages or bridging of the fluidized bed 12 but not significantly larger so that the maximum number of tubes 28 may be provided in the reaction zone 12.

The presence of these tubes 28, aids in limiting the growth of bubbles eg. tends to prevent bubble coalescing thereby to facilitate maximizing heat and mass transfer i.e. the presence of these tubes 28 influences bubble formation and thus the size of bubbles within the bed and optimizing the number, size (diameter) and spacing of such tubes may be used to increase the effectiveness of the bed.

The particular catalyst chosen will depend on the reaction intended. For example, a nickel catalyst supported over an alpha-alumina (nickel loading of 4% to 22%) having a mean particle size range of about 60 to 300 microns, has been found satisfactory for the reforming reaction and formation of the fluidized bed by natural gas, steam mixture maintained at a temperature of 650° to 950° C. under a pressure of 1.5 to 4.5 MPa.

The mixture in the above example will have a steam to carbon ratio preferably in the range of 1.2 to 6.

It will be apparent that the reaction in the fluidized bed 110 is an endothermic reaction and thus it is important that the temperature within the reaction zone of fluidized bed 12 be maintained. Suitable heat pipes or heat exchangers 36 have been shown schematically as embedded within the bed 12 and serviced by circulating a thermal fluid as indicated by the numeral 38 i.e. the tube 36 will form at least 1 loop for circulation of a thermal or heating fluid in and out of this fluidized bed 12. This will permit maintaining the temperature in the required range for the particular reaction described above or at any other selected temperature for any particular application to which the present invention may be applied.

While the embedding of a heat exchanger within the bed 12 is the preferred mode of heat transfer to the bed 12, other conventional means for supplying heat to the bed 12 may be used. For example, particles 26 may be withdrawn from the bed 12, heated and then returned to the bed 12 (see the Guerrieri U.S. Pat. No. 3,524,819 referred to above).

In the illustrated arrangement, the gases not absorbed by the separation tubes 28 move into the freeboard area 14 and tangentially into a cyclone schematically indicated at 40 in FIG. 1. These gases enter the cyclone 40 in the a right cylindrical body section 42 which tapers into a conical section 44 joining body 42 to an extension 46 which extends downwardly into the bed 12. The outlet end 48 of the extension 46 is buried well within the bed 12 so that particles separated in the separator 40 are reintroduced into the bed 12. The gas separated from the entrained particulate in the cyclone 40 pass as indicated by a line 50 to the further stage in its processing.

If desired some of the gas separated in the separator 40 and leaving the system may be redirected as indicated by line 52 under control of the valve 54 back into the system with the reaction gases in the blow box 18 and be used to adjust the desired degree of fluidization of the bed 12.

Generally, when the present invention is employed to produce hydrogen gas by a steam-hydrocarbon gas reaction such as the reaction between methane and steam, the reactions will be as follows:

$$CH_4 + 2H_2O \rightleftharpoons CO_2 + 4H_2 \qquad (1)$$

$$CH_4 + H_2O \rightleftharpoons CO + 3H_2 \qquad (2)$$

as the main reactions. These two reversible reactions will be further promoted by removal of hydrogen due to the shift in the chemical equilibrium provided the temperature within the fluidized bed is maintained.

A possible side reaction if CO is formed in the fluidized bed comprises:

$$CO + H_2O \rightleftharpoons CO_2 + H_2. \qquad (3)$$

Obviously, the removal of hydrogen will favour this reversible reaction as well.

It is important that as much hydrogen as possible be stripped from the product gases before the product gases are exhausted from the system. For this reason, the membrane tubes 28 extend not just through the fluidized bed 12 but through the freeboard zone 14 as well.

The separation tubes 28 within the freeboard 14 aid in further displacing the reaction mixture from the equilibrium compositions to avoid the reduction of methane conversion caused by the reverse reaction (methanation) which is favoured by the lower temperature in the freeboard 14 and in the lines 50 and 52.

It will be apparent that with the present system, the hydrogen gas leaving via line 31 is relatively pure hydrogen gas depending on the perm selective membrane material being used.

It will also be apparent that the gas passing into the freeboard and exiting via the cleaner 40 and line 50 is lean in hydrogen gas due to the separation tubes 28 and to the extension of the separation tubes 28 through the freeboard 14 and therefore is unlikely to undergo methanation over the entrained catalyst. The likelihood of the methanation reaction occurring after the particles of catalyst have been separated in the cleaner 40 is reduced even further.

It will also be apparent that the reactor and reacting system of the present invention permit the formation of relatively pure hydrogen gas in a single unit without the need for a purification process. The product gas composition may be controlled by adjusting recycle ratio i.e. the amount of gas recycled via line 52 and the setting of the vacuum pump 29 from a steam hydrocarbon gas reactor, such as a steam, methane or natural gas reactor.

Having described the invention, modifications will be evident to those skilled in the art without departing from the spirit of the invention as defined in the appended claims.

We claim:

1. A method for producing hydrogen gas comprising forming a fluidized bed of a suitable particulate catalyst by introducing reacting gases comprising a mixture of steam and hydrocarbon gas into the bottom of said fluidized bed to fluidize said particulate catalyst and form said fluidized bed, said fluidized bed occupying a portion of a vessel and forming a reaction zone, forming a freeboard zone in said vessel above said fluidized bed reaction zone, reacting said reacting gases within said fluidized bed reaction zone to produce hydrogen gas, separating said hydrogen gas from other gases in said fluidized bed reaction zone as molecular or atomic hydrogen through a perm selective membrane means that permits transfer of hydrogen therethrough while preventing the transmission of said other gases present in said reaction zone therethrough, separating further hydrogen gas from said other gases through said perm selective membrane means in said freeboard zone, said hydrogen gas after permeation through said perm selective membrane means providing a source of relatively pure hydrogen gas and withdrawing said relatively pure hydrogen gas.

2. A method as defined in claim 1 wherein said separating comprises first separating said hydrogen and said other gases from said particulate catalyst through a protective sheath and then separating said hydrogen from said other gases through said perm selective membrane means.

3. A method as defined in claim 1 further comprising withdrawing hydrogen gas from the side of said perm selective membrane means separated from said fluidized bed and to which said hydrogen passes to improve the permeation rate of said hydrogen through said perm selective membrane means.

4. A method as defined in claim 1 further comprising supplying heat to said reaction zone to maintain said fluidized bed reaction zone at a selected reaction temperature.

5. A method as defined in claim 1 further comprising separating said particulate catalyst from said other gases after leaving said fluidized bed reaction zone and recirculating said separated particulate catalyst back into said fluidized bed.

6. A method as defined in claim 1 further comprising recycling a selected amount of said other gas evolving from said reaction zone back into said reaction zone with said reacting gases to control fluidization of said fluidized bed.

7. A method as defined in claim 1 wherein said separating comprises first separating said hydrogen and said other gases from said particulate catalyst through a protective sheath and then separating said hydrogen from said other gases through said perm selective membrane means.

8. A method as defined in claim 7 further comprising withdrawing hydrogen gas from the side of said perm selective membrane means separated from said fluidized bed to which said hydrogen passes to improve the permeation rate of said hydrogen through said perm selective membrane means.

9. A method as defined in claim 8 further comprising supplying heat to said reaction zone to maintain said fluidized bed reaction zone at a selected reaction temperature.

10. A method as defined in claim 1 further comprising recycling a selected amount of said other gas evolving from said reaction zone back into said reaction zone with said reacting gases to control fluidization of said fluidized bed. N

* * * * *